United States Patent [19]

Enders

[11] 4,343,671
[45] Aug. 10, 1982

[54] TIRE BUILDING MACHINE
[75] Inventor: George E. Enders, Salem, Ohio
[73] Assignee: NRM Corporation, Akron, Ohio
[21] Appl. No.: 170,021
[22] Filed: Jul. 18, 1980
[51] Int. Cl.³ .................................. B29H 17/26
[52] U.S. Cl. ............................ 156/401; 156/131; 156/132; 156/403; 156/416
[58] Field of Search .............. 156/126, 131, 132, 398, 156/401, 403, 416

[56] References Cited
U.S. PATENT DOCUMENTS

| | | | |
|---|---|---|---|
| 3,433,695 | 3/1969 | Caretta et al. | 156/401 |
| 3,776,802 | 12/1973 | Mallory et al. | 156/401 |
| 3,784,426 | 1/1974 | Woodhall et al. | |
| 3,784,437 | 1/1974 | Appleby et al. | |
| 3,944,456 | 3/1976 | Cantarutti | 156/398 |
| 4,214,939 | 7/1980 | Enders | 156/398 |
| 4,230,517 | 10/1980 | Enders | 156/396 |

Primary Examiner—John E. Kittle
Attorney, Agent, or Firm—Maky, Renner, Otto & Boisselle

[57] ABSTRACT

The tire building machine comprises a tire building drum or shaper, annular bladders adjacent each end and a bead setter and bladder pusher mechanism movable axially of the drum selectively to set a tire bead in proper position and to push and effectively roll the bladder when inflated to cause the ply edges of the tire to be wrapped about the bead without air entrapment and stitched securely. Such mechanism includes a bead setting and pushing ring mounted for axial movement and hydraulic actuators are provided for effecting such movement. The ring has a flat face, a short axially extending radially inner annular surface or shelf for restricting expansion of a portion of the bladder rearwardly of the face when inflated thereunder, and a rounded inner peripheral edge or bead projecting beyond the shelf which grips the bladder when inflated to prevent relative sliding movement of the bladder and ring during bladder push. There is further provided a movable stop for precisely locating bead set and bladder pick-up positions of the ring and bead clamps for holding the tire bead to the ring during the bead set operation.

31 Claims, 11 Drawing Figures

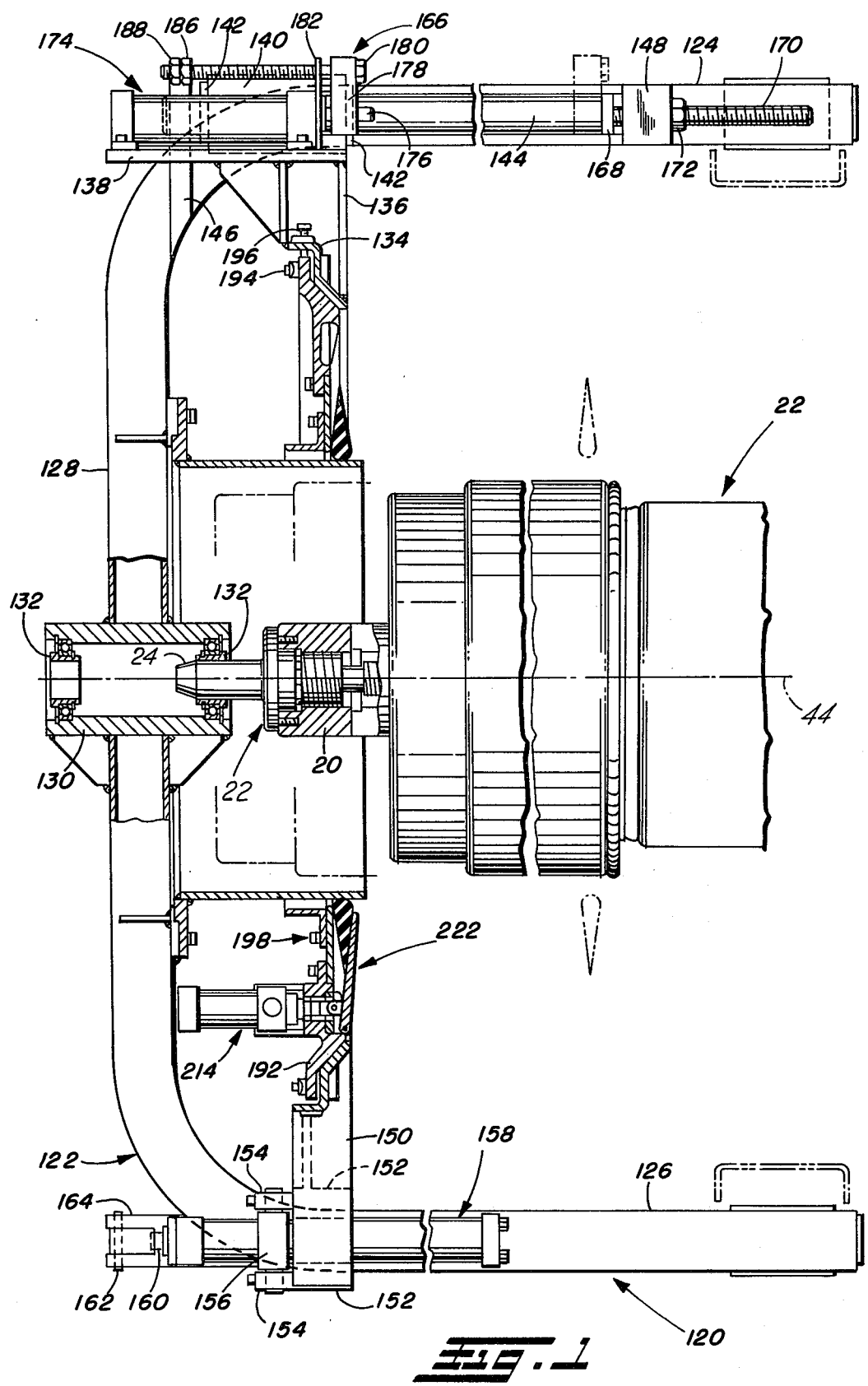

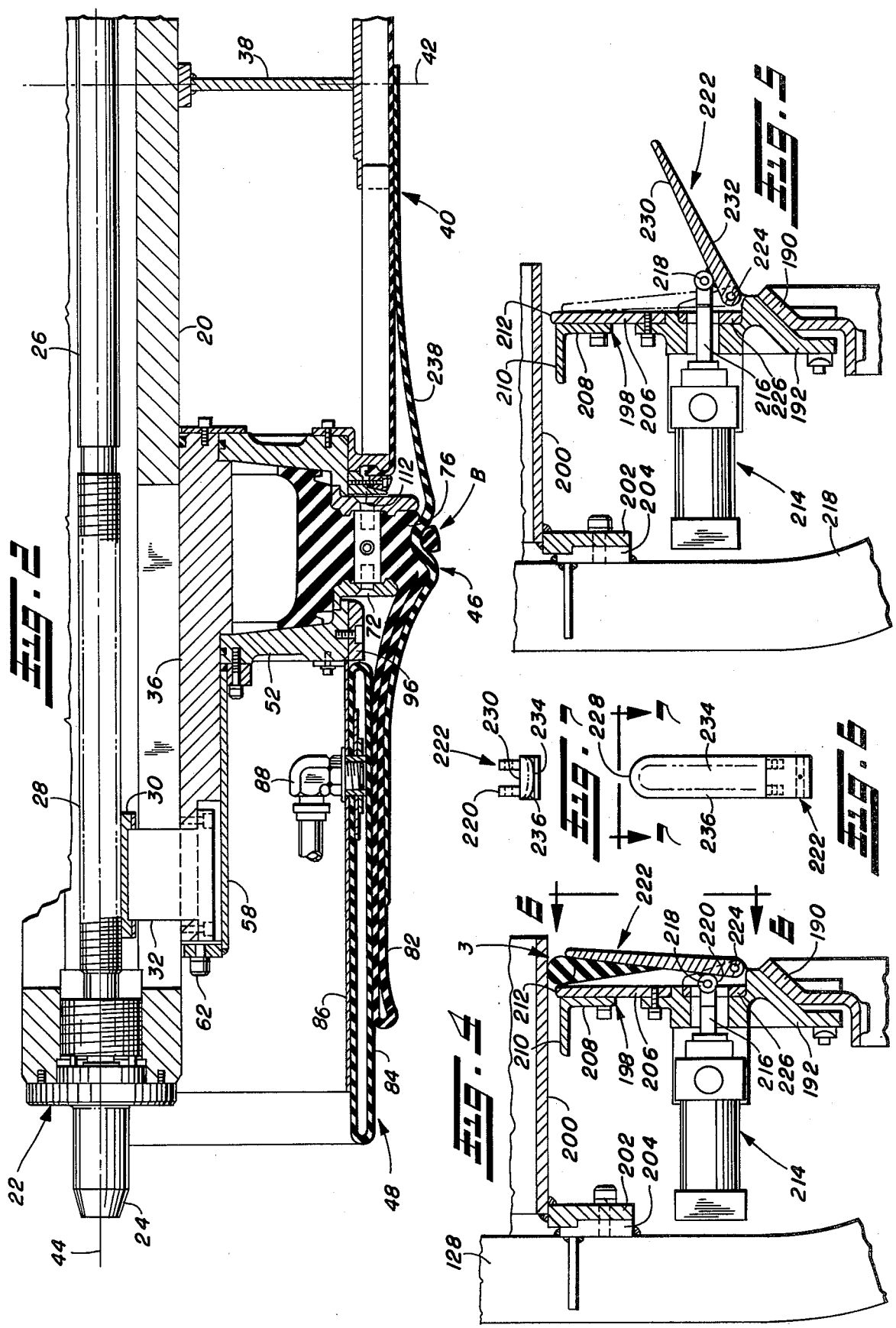

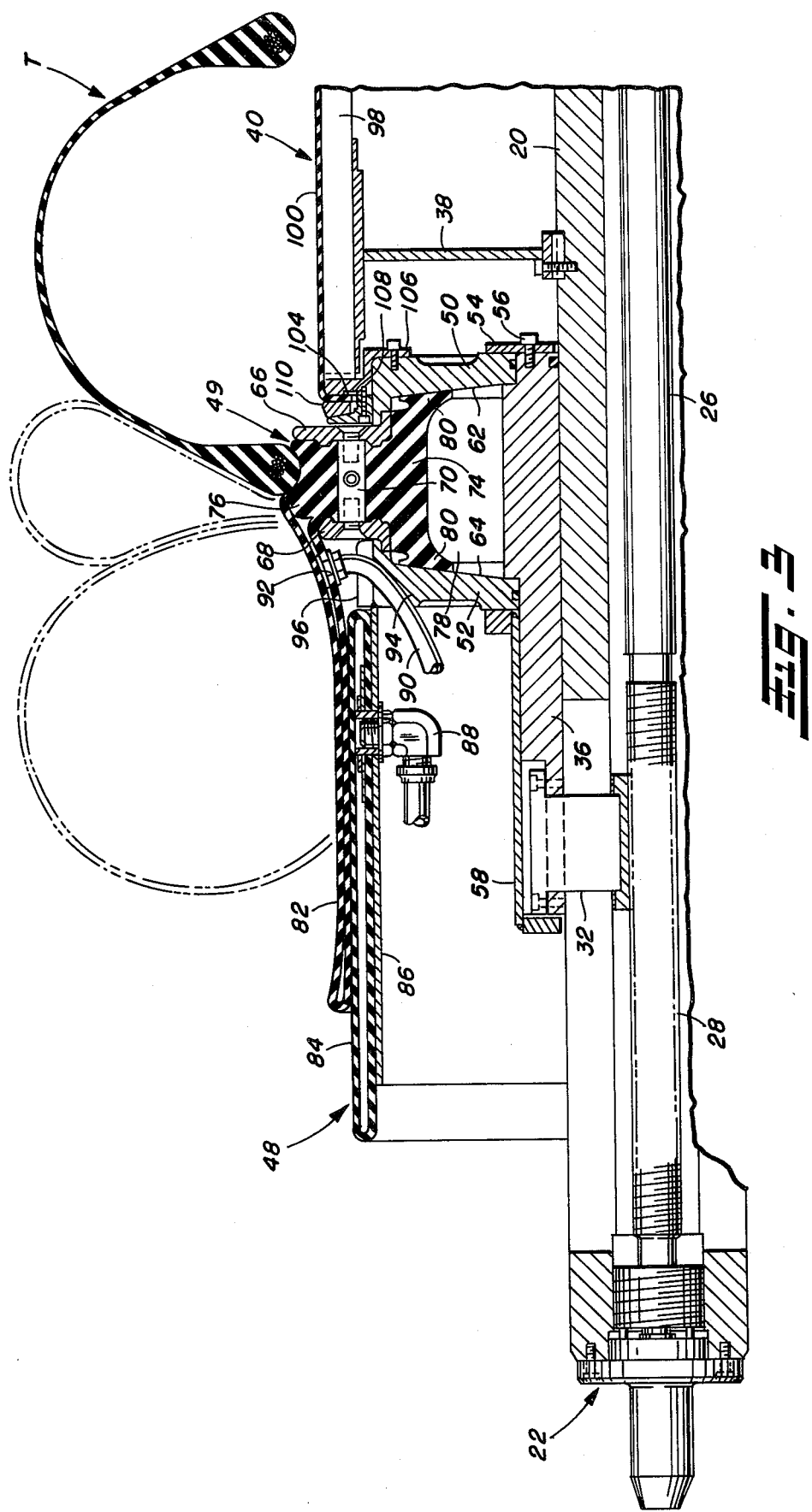

TIRE BUILDING MACHINE

BACKGROUND OF THE INVENTION

This invention relates generally as indicated to a tire building machine and a bead setter and ply turn-up assembly therefor, and more particularly to certain improvements in a tire building machine of the type disclosed in applicant's co-pending application Ser. No. 886,743, filed Mar. 15, 1978, entitled "Modular Tire Building Machine", now U.S. Pat. No. 4,230,517. Such application discloses a unique modular tire building machine that comprises a number of modular packages which can be used interchangeably in single stage, second stage or first stage assemblies. Some of the modular components are particularly useful in the manufacture of larger or truck type tires but can also be used in the automatic or semi-automatic production of smaller passenger size tires. One such modular component is an outboard bead setter mechanism that is supported on a carriage mounted device which device also functions as a transfer for bands, belt and tread assemblies or finished tires and as a retractable two-position idle journal support for the non-driven end of the main shaft of a tire building drum or shaper. Such tire building machine also includes a second or inboard bead setter mechanism opposite the outboard bead setter mechanism supported on the carriage mounted device, and both are adjustable omnidirectionally for accurate bead placement symmetrically about the axis centerline of the shaper or drum and thus the tire being built. Each bead setter mechanism includes a flat ring which constitutes a fixed bead gripping element for the tire bead and a number of bead gripping fingers for holding the bead against the ring. Such tire building machine also employs an expanding bead lock building and shaping mechanism of the general type disclosed in applicant's co-pending application Ser. No. 886,742, filed Mar. 15, 1978, entitled "Tire Building Machine", now U.S. Pat. No. 4,214,939. Such mechanism utilizes an annular elastomeric band or bead lock that is expanded radially beneath the bead properly to center and lock the latter in place for subsequent shaping and ply turn-up and wrapping operations. To effect the latter noted operation, the machine incorporates two expansible cooperating bladders at each end of the drum which, when inflated, will turn the ends of the ply material extending beyond the drum at each end thereof about the bead and firmly press or stitch the same.

While the foregoing tire building machine is suitable for the construction of certain types of tires, some difficulty in wrapping the plies around the bead with no air entrapment may occur with ply materials that are particularly stiff, namely wire, dual cross-ply aramids or cross-woven nylons. The tangential forces required to wrap tightly the stiffer materials around the tire beads generally cannot be obtained with conventional dual bladder turn-up assemblies without requiring high inflation pressures and substantially reducing the useful lives of the bladders. This is particularly a problem in the manufacture of larger or truck type tires. It therefore would be desirable to improve the performance of such tire building machine and other tire building machines in connection with the turning and wrapping of more difficult or stiffer materials, and accordingly it is a principal object of this invention to provide such improved performance in a tire building machine of the foregoing type as well as in other types of tire building machines of the general type described.

SUMMARY OF THE INVENTION

To the achievement of the aforenoted and other objects of this invention, there is provided a tire building machine which comprises a tire building drum or shaper, at least one inflatable annular bladder adjacent each end of the drum and a bead setter and bladder pusher mechanism movable axially of the drum selectively to set a tire bead in proper position and to push and effectively roll the bladder when inflated to cause the ply edges to be wrapped about the bead without air entrapment and stitched securely. The tire building drum or shaper preferably is of the expandable bead lock type wherein the bead locks are movable uniformly toward each other for converting the tire from its generally cylindrical to a toroidal or tire shape, and the bladders may be integral with the bead locks.

The bead setter and bladder pusher mechanism includes a frame on which a bead setting and bladder pushing ring is mounted for axial movement to and from the drum and hydraulic actuators are provided to move the ring selectively for bead set and bladder push operations. The ring has an axially inner radially extending flat surface which constitutes a fixed tire bead gripping and bladder pushing face and an axially extending radially inner annular surface which constitutes an annular shelf for restricting expansion of a portion of the bladder rearwardly of the face when inflated thereunder upon initiation of bladder push so that resultant forces are induced towards the tire bead. The ring is further importantly provided with a rounded inner peripheral edge forming a bead projecting beyond the annular shelf adapted to engage and grip the bladder when inflated to prevent relative sliding movement of the bladder and ring during bladder push which would adversely affect performance. A preferred construction of the ring consists of a flat annular face plate having a rounded inner peripheral edge defining the bead and a short axially outwardly extending annular flange secured to the plate in slightly radially outwardly offset relation to the thusly defined bead thereby forming a fabricated bead ring of the desired configuration.

The bead setter and bladder pusher mechanism further includes an axially extending cylindrical bead positioning cylinder for facilitating placement of the tire bead against the bead ring after which a number of bead fingers are retracted against the tire bead to hold the tire bead against the ring. Each finger in pivoted at its radially outer end and is swung to and from its retracted position by an actuator. The radially innermost portion of the finger is substantially flat at its side facing the flat face of the ring while its opposed side is rounded at its peripheral edges and tapered so that the fingers will fit substantially flush against the face of the ring when fully retracted thereby not to interfere significantly with the bladder during bladder push.

As mentioned above, the bead setting and bladder pushing ring is mounted on the frame for axial movement and hydraulic actuators are provided for moving the ring to and from the drum. Axial movement of the ring by the hydraulic actuators is limited by confronting stops on the ring and frame, at least one stop being movable axially from a first position identifying a bead set position to a second position identifying a bladder pick-up position upon initiation of the bladder push operation. Such movable stop preferably is movable by means of a hydraulic actuator between its first and second positions, there being provided positive stop means for limiting the stroke of this hydraulic actuator to determine precisely such first and second positions. The other stop may also be adjustable axially.

In accordance with the preferred operation, the bead setting and bladder pushing ring, having previously set the tire bead and with the bead locks expanded, is moved to a bladder pick-up position with the ring face located about ⅝ to ¾ the axial length of the bladder away from the tire bead. At the same time, the tire carcass is pressure shaped. The bladder thereafter is inflated with the bladder ballooning forwardly of the pusher ring but being restrained at the pusher ring by the annular shelf of the ring. The ring is then advanced towards the drum pushing and rolling the expanded or balloon portion of the bladder ahead of the ring while a portion of the bladder will roll from behind the ring to form a second ballon portion which assists the radially inner bead of the ring in preventing relative sliding movement of the bladder and ring during bladder push. When the ring has reached its final position, the pressure in the bladder will have increased to about the internal pressure in the shaped carcass. The ring is held in its final position for a predetermined period of time to assure a tight stitch of the bead and tire plies.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary top plan view, partly in section, of the tire building machine, there being illustrated in particular a preferred form of bead setter and bladder pusher mechanism in accordance with this invention;

FIG. 2 is a fragmentary bottom quarter section of the tire building machine, illustrating in particular the construction of the tire building drum or shaper and the bladder assemblies employed therewith, with the bead locks expanded but with the tire plies generally in their flat or band shape;

FIG. 3 is a view similar to FIG. 2, but illustrating the opposed top quarter section of the drum or shaper with the bead locks expanded and moved toward each other to convert the tire carcass from the generally flat band depicted in FIG. 2 to its toroidal shape;

FIG. 4 is an enlarged view of a portion of FIG. 1, illustrating the bead setting and bladder pushing ring with the bead clamp fingers shown retracted and holding the tire bead in place against the face of the ring;

FIG. 5 is a view similar to FIG. 4, but illustrating in solid lines the bead clamp fingers extended out of the way for permitting placement of the tire bead against the face of the ring, and in phantom lines, the fingers fully retracted;

FIG. 6 is a vertical elevation of a bead clamp finger as viewed from the line 6—6 of FIG. 5;

FIG. 7 is an end view of the bead clamp finger of FIG. 6 as viewed from the line 7—7 thereof.

DETAILED DESCRIPTION

Figure 8:
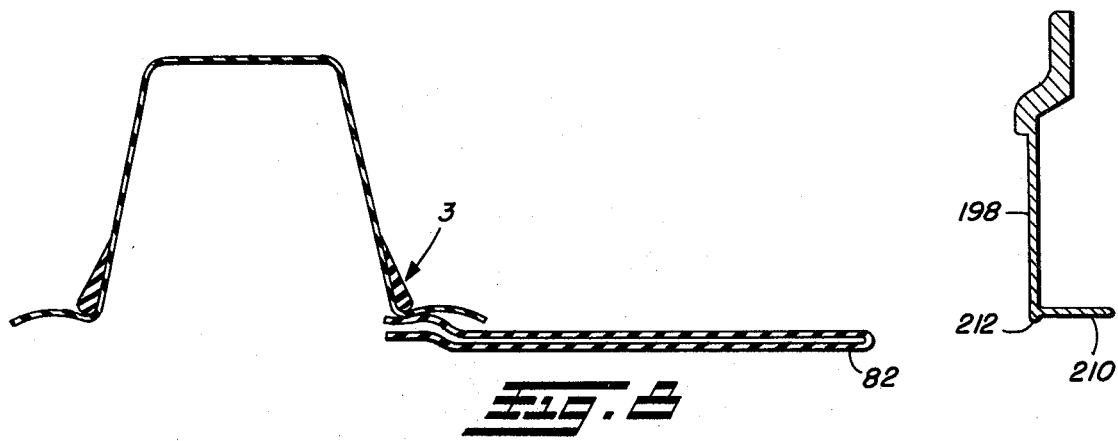
FIGS. 8–11 are schematic sequence diagrams illustrating the ply turn-up and wrapping operation in accordance with the invention.

Referring first to FIGS. 2 and 3, the tire building machine comprises a main drive shaft 20 for supporting thereon the expanding bead lock drum and shaper assembly shown generally at 22. The main shaft 20 may be mounted and driven for rotation in conventional manner. The outboard end of the main shaft as seen at the left in FIGS. 2 and 3 is provided with a pilot nose 24 which may be supported in a retractable tail stock or preferably by a carrier of the type shown in the aforementioned application Ser. No. 886,743, which is hereby fully incorporated herein.

The main shaft 20 can be seen to be tubular and has journaled therewithin a screw shaft 26 which may be rotated together with or separately of the main shaft as required. The screw shaft 26 is provided with an outboard threaded section 28 which is in mesh with a nut 30 which includes a key 32 projecting through slot 34 and secured to the axial outer end of an outboard sleeve 36 which rides or slides on the exterior of the main shaft. It should be understood that the inboard end of the drum 22 includes a similar arrangement of parts but with the screw shaft at the inboard end having an opposite hand threaded section in mesh with a correspondingly threaded nut.

With the exception of the center support 38 of the center deck shown generally at 40, the major components are supported on the sleeves 36 for axial sliding movement uniformly toward and away from the transverse centerline of the tire building machine, such transverse centerline being identified by reference numeral 42. The other centerline of the machine is the axis of the main and screw shafts, and of course the sleeves, and is identified by reference numeral 44. For precision in tire construction, the components of the tire must be assembled with proper symmetry and squareness with respect to both centerlines.

In addition to the center deck 40, the other major components of the machine are the bead lock assemblies and the dual bladder assemblies, the outboard ones of which are shown generally at 46 and 48, respectively. Other than minor variations, the respective inboard assemblies are identical but reversely orientated to the outboard assemies shown and further described below.

The construction of the outboard bead lock assembly 46 need only be briefly described since it is substantially similar to that shown and described in applicant's assignee's application Ser. No. 022,429, entitled "Tire Building Machine", filed Mar. 21, 1979, now U.S. Pat. No. 4,244,770, which is hereby fully incorporated herein. It will be seen that the bead lock assembly 46 includes a relatively large rubber band or ring 49 which is supported for radial movement between flanges 50 and 52 secured to the inner end of the sleeve 36. The inner flange 50 is seated against a shoulder on the exterior of the sleeve and held in place by a retainer ring 54 secured to the inner end of the sleeve by a fastener 56. The outer flange 52 is secured against a shoulder on the exterior of the sleeve by elongated flanged clamping sleeve 58 which is secured both to the end of the sleeve 36 and flange 52 by the fasteners 60. The interior or facing surfaces 62 and 64 of the flanges 50 and 52, respectively, beyond the shoulders on the sleeve 36 are slightly radially symmetrically inclined toward each other and such inclined wall surfaces may be provided with a smooth coating of a high lubricity resin such as polytetrafluoroethylene. The inside top edges of the flanges 50 and 52 are provided with double shoulders with the outer shoulders thereof providing concentric stop surfaces for the interior outwardly facing flanges of interconnected L-shape metal sector plates 66 and 68, respectively. Interconnecting each pair of sector or side plates is a hex bar 70, each end of which is provided with a tapped hole to receive recessed head fasteners 72.

The sector plates 66 and 68 when so interconnected are located at opposite sides of the rubber band 49 which may be molded in two principal parts 74 and 76 joined at a cylindrical circular parting plane which extends through the centers of the hex bar 70. The inner principal part 74 extends from the hex bars radially inwardly and closes the outer end of the trapezoidal chamber 78 formed by the flanges 50 and 52. The inner portion is formed with legs 80, the outer or axial surfaces of which are coextensive with the symmetrical non-parallel sides of the trapezoid of the annular chamber 78 formed by the flanges. It will be appreciated that air, or vacuum, for the bead locks may be supplied through suitable passages in the manner shown in the aforenoted application Ser. No. 022,429. Air pressure acting on the underside of the bead lock urges the band radially outwardly precisely to center and lock a tire bead B previously positioned to circumscribe the band as seen in FIG. 2.

The outer principal part 76 of the band 48 may have integrally formed therewith the outer bladder 82 of the outboard dual bladder assembly 48 which also includes a radially inner bladder 84. When deflated as seen in FIGS. 2 and 3, the outer bladder lays over the inner bladder and both are supported in such condition in a cylindrical fashion by a cylindrical can or extension 86 which is supported by the outer flange 52. The inner bladder is mounted on the can 86 with elbow fittings 88 projecting through the can for inflation of the bladders. As seen in FIG. 3, the outer bladder is inflated through a bent flexible tube 90 secured by a fitting 92 to the bladder adjacent the bead lock. To accommodate the bent flexible tube 90, the outer shoulder of the outer flange 52 is relieved or notched at 94. The outer flange 52 may also have secured to its radially outer edge a number of spacer rings 96 against which the axially inner edge of the inner bladder 84 abuts. Preferably there are four such rings 96 with the ends thereof circumferentially spaced to accommodate the inflation tubes 90 for the outer bladder 82.

While the outer flange 52 supports the dual bladder assembly 48, the inner flange 50 may support the center deck 40 in the manner illustrated, such center deck comprising an array of interfitting axially projecting fingers 98 as more clearly shown and described in the aforementioned application Ser. No. 886,742. Also as indicated in such prior application, the center deck may be covered by an elastic sleeve 100 which may be perforated to permit the entire chamber between the inner flanges 50 of the inboard and outboard bead locks and radially beneath the tire plies to be inflated to assist in shaping the tire T to the toroidal configuration shown in FIG. 3.

The elastic sleeve 100 seen herein is in the form of an annular band which is provided at its annular edges with inwardly projecting beads 104. The annular edges are folded over a flange piece 106 secured to the inner flange 50 with the beads 104 thereof accommodated in an axially opening annular groove 108 in the axial end of the flange piece 106. The bead is held in the groove and the annular edge of the sleeve clamped by means of a clamp or wedge ring 110 which is secured by fasteners to an adapter ring 112 in turn secured to the flange piece 106. The adaptor ring and clamp ring have confronting inclined surfaces which cooperate wedgingly to secure the annular edge of the elastic sleeve. So that the sleeve may be readily changed without disassembly of the deck or bead locks, the clamp rings preferably consist of a plurality of arcuate segments.

With the machine as thus far described, the same may go through a number of sequential steps to construct a tire. One such sequence is described in applicant's aforementioned application Ser. No. 022,429. During such sequence, it will be seen that the tire bead is set by a bead setter mechanism and the plies previously positioned on the drum and shaper assembly are wrapped around the beads and stitched by inflation of the outer and inner bladders, the latter acting on the former to force it tangentially against the outside of the tire as seen in phantom lines in FIG. 3. While the dual bladder assemblies may be employed to wrap the tire plies around the beads, improved performance may be desired where more difficult or rigid materials are required to be wrapped around the bead. To this end, and as described below, there is provided an improved bead setter and bladder pusher mechanism which provides for improved wrapping of the material around the bead as well as for setting the bead.

Referring now to FIG. 1, the bead setter and bladder pusher mechanism is shown generally at 120 and comprises a frame 122. When employed as an outboard mechanism in the modular tire building machine of the type described in the aforementioned application Ser. No. 886,743, the frame is U-shape and the parallel legs 124 and 126 may have secured at their distal ends a shaft which is journaled for rotation in the manner described in such application. In other types of tire building machines, the frame may take other forms and be fixedly secured by suitable means to the supporting structure of the machine as is the inboard mechanism of the aforementioned modular tire building machine.

As seen in FIG. 1, the frame 122 is fabricated of a rigid rectangular tubular member and includes a bight portion 128 interconnecting the parallel legs 124 and 126. In the center of the bight portion, there is provided a sleeve 130 which at each end includes a ball bearing journal 132 adapted to receive the pilot nose 24 of the main shaft 20 of the tire building machine.

The frame 122 has mounted thereon for axial movement a circular frame 134. As seen at the top in FIG. 1, the circular frame is secured by a bracket 136 to the underside of a plate 138 which in turn is secured to the inner surface of a bearing housing 140. The bearing housing and thus the circular frame is mounted for sliding axial movement by bearings or slides 142 at each end of the housing on an axially extending guide rod or shaft 144. The guide shaft 144 is secured to the frame 122 at one end by a bracket 146 extending from the curved portion of the frame. The other end of the guide shaft is supported by a bracket 148 extending from the leg 124 near its distal end. Although not shown, a similar arrangement is provided at the other leg 126 of the frame but at the opposite side thereof.

As seen at the bottom in FIG. 1, the circular frame 134 has secured thereto a pair of generally radially extending brackets 150 between which are secured at their outermost ends a pair of radially spaced spacer plates 152. The spacer plates 152 have axially outwardly extending trunnion mounts 154 between which is pivoted a cylinder support block 156 of a piston-cylinder assembly 158. The piston-cylinder assembly 158 is of relatively long stroke and extends generally axially with its rod end 160 connected at pivot 162 to a clevis bracket 164 secured to the leg 126 of the frame 122. Although not shown, a similar arrangement is provided at the other leg 124 of the frame but at the opposite side thereof and thus opposite the guide shaft 144 and the elements associated therewith. Actuation of the piston-cylinder assemblies 158 will effect axial movement of the circular frame 134 along the guide shaft 144, such movement however being limited by engagement of a movable stop assembly 166 with an adjustable bumper 168 secured to a stud 170 which is threadedly received in a bore in the bracket 148. A lock nut 172 may be provided on the stud to lock the bumper 168 in its adjusted position.

The movable stop assembly 166 includes a hydraulic piston-cylinder assembly 174, the cylinder of which is mounted on the plate 138. The piston-cylinder assembly 174 extends axially and has secured to its rod end 176 a stop block or plate 178. The stop block 178 has secured thereto an axially projecting threaded stud 180 which extends through an oversized hole in a plate 182 secured to the face of the cylinder of the assembly 174. The end of the threaded stud is provided with an adjustment nut 186 and lock nut 188 therefor which may be readily adjusted to determine the maximum extension or stroke of the piston-cylinder assembly 174.

It should be understood that the stop block 178 is in axial alignment with the bumper 168 and will confrontingly engage the bumper to limit axial movement of the stop block and thus the circular frame 134 along the guide shaft 144 toward the drum and shaper assembly 22. It will be appreciated that with the stop block engaged against the bumper, first and second positions are determined depending on whether the piston-cylinder assembly 174 is extended or not. Such positions are precisely located through adjustment of the bumper 168 and stroke adjusting nut 186.

Referring now additionally to FIGS. 4 and 5, it will be seen that the circular frame 134 includes a beveled flange 190 the inner surface of which is a spherical radius. To the beveled flange is secured an adapter 192 which includes a spherical portion mating the interior spherical surface of the beveled flange 190. Centering screw mechanisms 194 and 196 secure the adapter to the circular frame 134 and provide for omnidirectional adjustment so that the adapter can be mounted on the frame in a manner such that it is normal to the axis 44 and axially aligned therewith.

The adapter 192 has secured at its inner end a bead setting and bladder pushing ring 198 which constitutes a fixed bead gripping and bladder pushing element. The ring 198 at its inner end is closely adjacent to a bead positioning cylinder 200, the left end of which as seen in FIG. 1 is provided with a shouldered flange 202. Such flange is removably secured to an annular shouldered ring 204 secured to the interior of the bight portion 128 of the frame 122.

As best seen in FIGS. 4 and 5, the ring 198 consists of a flat annular face plate 206 to which is secured at its axially outer side a flange piece 208 of L-shape cross-section. The flange piece 208 includes a short axially extending annular flange or portion which extends outwardly from the plate and has an annular inner surface or shelf 210 slightly radially outwardly offset from the inner peripheral edge 212 of the plate 206 which edge 212 as seen is rounded to form a radially inwardly projecting bead, the purpose of which will become more apparent below. The axial length of the annular inner surface with which successful results may be obtained is about 15% the axial length of the bladder from the bead lock center while the bead 212 may have a thickness of about ¼ inch.

Mounted on the outer or lefthand side of the adapter 192 as seen in FIGS. 4 and 5 are four piston-cylinder assemblies 214, the rods 216 of which extend through the adapter and are connected by pins 218 to outwardly projecting lugs 220 on bead clamping fingers 222. The bead clamping fingers are mounted at their radially outer ends at pivots 224 between pivot blocks 226 secured to the axially inner or righthand side of the adapter as seen in FIGS. 4 and 5. In the substantially retracted position seen in FIG. 4, the fingers will hold a tire bead B against the face of the ring 198. In the extended position of the piston-cylinder assemblies 214, the fingers 222 will swing clear of the bead face as seen in FIG. 5 in solid lines to enable the operator to place a new bead on the positioning cylinder 200 for the next building cycle. The piston-cylinder assemblies may also be fully retracted to bring the fingers substantially flush with the face of the plate as seen in phantom lines in FIG. 5.

With additional reference to FIGS. 6 and 7, it will be seen that the fingers 222 are of a configuration so that when fully retracted, they will not substantially interfere or cause damage to the bladder during the bladder push operation described below. The fingers are generally rectangular in shape but with the radially inner ends rounded as seen at 228 in FIG. 6, and are tapered in thickness with the radially inner end being the thinnest. The side 230 of each finger facing the ring is flat while the opposite side 232 is slightly convexly rounded at its center portion 234 and more sharply rounded at its peripheral edges 236 at the radially inner portion thereof.

OPERATION

With the tire building machine of the present invention, a wide variety of process or building steps may be employed depending upon the components employed in the tire. For example, the bead lock and pusher mechanism 120 may be employed simply as a bead setter with the ply turn-up and wrapping operation being performed by the dual bladder assemblies 48 such as in the manner previously indicated. However, the pusher mechanism 120 may be used, for example, with difficult and stiff ply materials and accordingly, the following is a discussion of the sequential steps which may be employed according to the invention.

In the start position, the drum and shaper assembly 22 is axially extended as seen in FIG. 2 and in phantom lines in FIG. 1. The bead locks 46 as well are shown extended but initially they are contracted to permit positioning of the tire bead B thereabout. The shaping bladders 82 and 84 are initially exhausted. In its full flat condition, the drum and shaper assembly forms an elongated generally cylindrical drum having a diameter somewhat less than the inside diameter of the bead of the tire to be built. Also in such start position, the bead clamp piston-cylinder assemblies 214 are extended to enable the operator to place a new bead on the positioning cylinder 200 against the ring 198. At this point, the piston-cylinder assemblies 214 are retracted and thus the fingers 222 for holding the tire bead against the bead face of the rings 198.

Either before or after placing the bead against the ring 198, the operator will place an inner liner on the center deck 40 carefully centering the same with respect to the transverse centerline 42 followed by components such as wire chafers, body plies, sidewalls and belt cushions. The body plies seen at 238 in FIG. 2 of course extend axially beyond the bead locks 46 and overly the inner portions of the outer bladders 82. After such components are applied and stitched as necessary, the long stroke piston-cylinder assemblies 158 of the mechanisms 120 at each end of the drum are extended to move their respective rings 198 and the tire beads held thereby axially towards the drum to set the beads in their proper position circumscribing the bead locks 46. The bead set position will be precisely determined by engagement of the retracted stop block 178 with the bumper 168. The bead locks may now be expanded to engage and lock the tire beads thereto. The bead clamp cylinders 214 are then extended to release the tire beads, the tire beads now being set and held in place by the expanded bead locks. The long stroke piston-cylinder assemblies 158 may now be retracted to clear the bead locks and after the bead fingers 222 clear the tire beads, the fingers may be fully retracted so that they fit substantially flush against the face of the rings 198 and thus are ready for the subsequent bladder push operation.

The tire carcass may now be slightly inflated to cause it to bulge outwardly approximately to the same extent as the negative crown seen in FIG. 2 to insure that the carcass is free of the sleeve 100 of the center deck 40. With the bead locks 46 continuing in their expanded condition, the carcass is now preshaped such as with 6 psi internal air pressure to approximately 80% of its final shape as seen in FIG. 3. This is accmplished by locking the main shaft 20 and rotating the screw shaft 26. The center deck automatically axially contracts as the carcass is inflated and the bead locks move uniformly toward each other. At this point, a previously constructed belt or belt and tread assembly may be transferred axially of the machine to the transverse centerline 42 of the drum. In such position, the belt is held by a transfer at the transverse centerline and the carcass is then fully shaped into the interior of the belt as depicted in FIG. 8. The internal carcass pressure may for example be brought to about 17 psi.

At this point, the piston-cylinder assemblies 174 of the movable stop assembly 166 and the long stroke piston-cylinder assemblies 158 are extended to move the ring 198 axially and to position it in a bladder pick-up position about ⅔ to ¾ the length of the outer bladder from the bead. In the production of 22.5 inch tires, successful results may be obtained by locating the ring about 11.5 inches from the bead lock centerline. Such bladder pick-up position will be precisely determined by engagement of the extended stop block 178 with the bumper 168.

Figure 9:
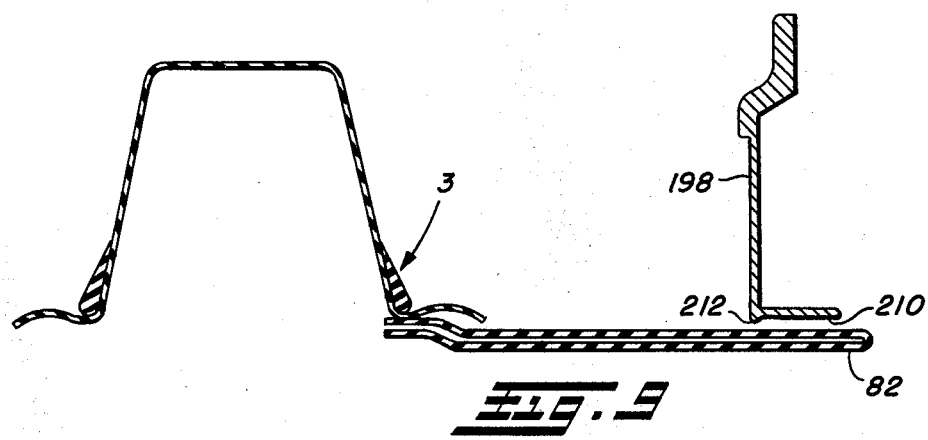
Figure 10:
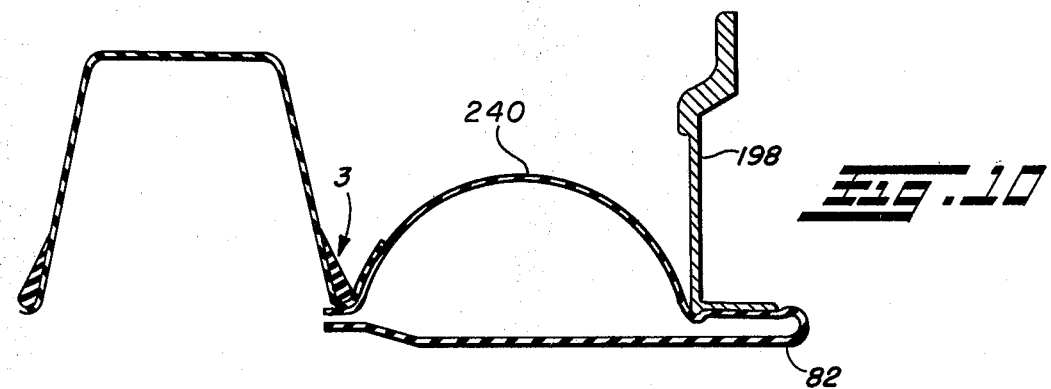

With the ring 198 in its bladder pick-up position as seen in FIG. 9, the outer bladder 82 is inflated such as to about 10 psi. As pressurized air is introduced into the outer bladder, the bladder will balloon and tend to assume a circular cross-section. However, ballooning of the bladder will be restricted at its axially outward portion by the ring as seen in FIG. 10 with there being formed a semi-circular bulge 240 forwardly or inwardly of the face of the ring. When in this position, the plies will have been partially turned up.

Figure 11:
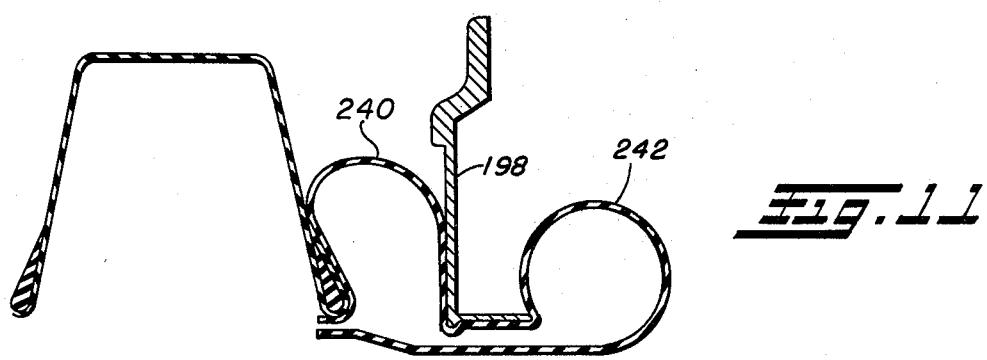

The long stroke piston-cylinder assemblies 158 may now be extended and the piston-cylinder assemblies 174 retracted to move the ring 198 axially inwardly a predetermined amount such as until the stop block 178 in its fully retracted position again engages the bumper 168. Hydraulic pressures on the order of 1000–1200 psi acting on 2 inch bore assemblies 174 may be employed. As the bladder pushing ring moves toward the drum, the bulge or balloon portion 240 forwardly thereof will be rolled tangentially and will uniformly and sequentially press against a radially enlarging area of the tire sidewall thereby to wrap the body plies around the bead. It will further be appreciated that as the ring pushes the bladder towards the drum, a portion of the bladder will roll from behind the ring. This is because the flange or shelf 210 is relatively short and permits formation of a second balloon portion 242. During such pushing operation, slippage between the bladder and ring is precluded by the radially inwardly projecting bead 212 which extends into and grips the bladder. In addition, towards the end of the push operation when substantial axial forces are exerted on the bladder by the ring, the second balloon portion 242 will have expanded to a considerable extent as seen in FIG. 11 thereby further interlocking the bladder and ring against slippage. It will also be seen that the radially inner wall of the axially inner portion of the outer bladder 82 will remain substantially flat against the cylindrical support therefor. This reduces the stresses, for example, at the air supply fittings of the bladders which are known problem areas.

In the position seen in FIG. 11, the plies will have been fully wrapped about the tire bead. As desired, such position may be maintained for a predetermined length of time to assure a tight stitch of the bead and lower sidewall region. It will be appreciated that as the bladder is pushed by the ring, the pressure therein will increase to say approximately 16 psi or substantially equal the internal pressure in the carcass.

The outer bladder 82 is now deflated and when deflated will return to its generally cylindrical flat condition. After the bladder is deflated, the long stroke piston-cylinder assemblies 158 may be retracted to move the ring 198 to its initial position to enable the operator to place a new bead on the positioning cylinder 200 for the next building cycle. The bead locks 46 may also then transverse outwardly to their original position and another tire may be constructed.

It will be appreciated that the steps described may vary considerably and that the sequence may also vary. For example, some tires are built with the sidewall over the tread and others are built with the tread over the sidewall. In the latter case the sidewall may be applied before the tread. Also the belt or belt and tread assembly may be constructed directly on the shaped carcass or band as the carcass in its shaped condition is rotated. It will also be appreciated that the outer bladder and pusher ring may be employed for ply wrapping while the dual bladder assembly is employed for sidewall application.

It will further be appreciated that the machine of the present invention may be used simply as a first stage machine or simply as a second stage shaping machine. In the case of the former, the center deck need not contract and the bead locks need not move toward each other. The dual bladders would simply inflate or alternatively the outer bladder inflate and the pushing ring be employed in the aforedescribed manner to wrap the plies around the bead. The bead locks would then release the unshaped tire band. The tire band would then be shaped and completed at a second stage machine whereafter components such as sidewalls and belt cushions could be stitched to the cylindrical band prior to the shaping, particularly in view of the essentially rigid nature of the center deck.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A tire building machine comprising a tire building drum adapted to receive tire plies wrapped thereabout with the edges of the plies extending beyond the ends of the drum, an inflatable annular bladder extending axially outwardly from one end of said drum, an annular support for said bladder, and a bead setter and bladder pusher mechanism at said one end of said drum and movable axially of said drum selectively to set a bead in proper position on said drum and to push the bladder when inflated to cause the ply edges to be wrapped around the bead and stitched securely; said mechanism including a bead setting and bladder pushing ring, said ring having an axially inner face adapted for selective engagement with the tire bead and bladder, a short radially inner annular surface extending axially outwardly from said face for restricting expansion of a portion of the bladder rearwardly of said face when inflated, and a rounded inner peripheral edge forming a bead projecting beyond said annular surface at said face adapted to grip the bladder when inflated to prevent relative sliding movement of the bladder and ring during bladder push.

2. The machine of claim 1 wherein said ring includes an annular plate forming said inner face and having a rounded inner peripheral edge defining said bead, and an annular flange forming said radially inner annular surface and being slightly radially outwardly offset from the inner peripheral edge of said plate.

3. The machine of claim 1 wherein said mechanism further comprises a frame, means for mounting said ring on said frame for axial movement to and from said drum, means to effect such axial movement of said ring, and confronting stop surfaces on said ring and frame operative when engaged to limit axial movement of said ring in one direction, at least one of said stop surfaces being movable axially between a first position identifying a bead set position and a second position identifying a bladder pick-up position.

4. The machine of claim 3 comprising a hydraulic actuator for moving said one stop from its first position to its second position.

5. The machine as set forth in claim 4 further comprising positive stop means for limiting the stroke of said actuator to determine at least one of said first and second positions.

6. The machine of claim 5 wherein the other of said stop surfaces is axially adjustable.

7. The machine of claim 4 wherein said means to effect comprises a hydraulic actuator.

8. The machine of claim 4 wherein the cylinder to said actuator is mounted on said ring for movement therewith.

9. The machine of claim 3 wherein said means for mounting said ring comprises diametrically opposed guide shafts on said frame for said ring.

10. The machine of claim 1 wherein the axial length of said annular surface is about over 1/6 the axial length of said bladder.

11. A tire building machine comprising a tire building drum, a turn-up bladder and support therefor, and a bead setter and bladder pusher assembly, said assembly including a frame, a bead setting and bladder pushing ring mounted on said frame for axial movement to and from said drum, means to move said ring axially, confronting stop surfaces on said ring and frame operative when engaged to limit axial movement of said ring in one direction, and means for axially moving the stop surface on one of said ring or frame between first and second positions on said one of said ring or frame, such axially movable stop surface when engaged with the other stop surface on the other of said ring or frame identifying in its first position a bead set position for said ring and in its second position a bladder pick-up position for said ring.

12. The machine of claim 11 wherein said means for axially moving includes a hydraulic actuator for moving said axially movable stop surface between its first and second positions.

13. The machine of claim 12 further comprising positive stop means for limiting the stroke of said actuator to determine at least one of said first and second positions.

14. The machine of claim 13 wherein said other stop surface is axially adjustable.

15. The machine of claim 12 wherein said means to move said ring comprises a hydraulic actuator.

16. The machine of claim 12 wherein the cylinder of said actuator is mounted on said ring for movement therewith.

17. The machine of claim 11 wherein said ring is mounted by diametrically opposed guide shafts on said frame.

18. A bead setter and bladder pusher mechanism comprising a frame, a bead ring mounted on said frame for axial movement, a hydraulic ring actuator operative to move said ring axially, and a hydraulic movable stop acting in opposition to said hydraulic ring actuator to identify in one position a bead set position and in another a bladder pick-up position.

19. The mechanism of claim 18 wherein said hydraulic movable stop includes confronting stops on said ring and frame operative when engaged to limit axial movement of said ring in one direction and a hydraulic actuator for effecting axial movement of one stop between first and second positions identifying respectively bead set and bladder pick-up positions when said confronting stops are engaged.

20. A tire building machine comprising a tire building drum, a turn-up bladder and support therefor at the side of the drum, and a bead setter and bladder pusher mechanism movable axially of the drum selectively to place a bead in proper position and to roll the bladder when inflated for wrapping the tire plies and stitching them to the bead, said mechanism including a bead setting and bladder pushing ring, said ring having a rounded inner peripheral edge defining a bladder gripping bead and an axially outwardly extending cylindrical shelf slightly radially outwardly offset from said bead, and means operative axially to move said setting and pushing ring.

21. The machine of claim 20 wherein said means includes a hydraulic actuator.

22. The machine of claim 20 wherein the axial length of said shelf is about 1/6 the length of said bladder.

23. The machine of claim 20 wherein said mechanism further includes bead gripping fingers pivoted at their radially outer ends to said ring for movement in a plane perpendicular to the face of said ring, and actuators for swinging said fingers from a retracted position holding said bead to the face of said ring to an extended position releasing the bead.

24. The machine of claim 23 wherein said fingers are adapted when fully retracted to fit substantially flush with the bead setting face of said ring so as not to interfere substantially with the bladder during bladder push.

25. The machine of claim 24 wherein said fingers have a substantially flat bead engaging side and an opposed side which is rounded at its peripheral edges at its radially inner portion.

26. The machine of claim 20 wherein said drum includes two bead locks, a cylindrical deck therebetween, means to move said beat locks toward and away from each other, and means axially to expand and contract said center deck as said bead locks thus move.

27. The machine of claim 26 wherein said bladder is integral with its respective bead lock.

28. A tire building maching comprising a tire building drum adapted to receive tire plies wrapped thereabout with the edges of the plies extending beyond the ends of the drum, an inflatable annular bladder extending axially outwardly from one end of said drum, an annular support for said bladder, and a bead setter and bladder pusher mechanism at said one end of said drum and movable axially of said drum selectively to set a bead in proper position on said drum and to push said bladder when inflated to cause the ply edges to be wrapped around the bead and stitched securely; said mechanism including a bead setting and bladder pushing ring, said ring having an axially inner face adapted for selective engagement with the tire bead and bladder and a short radially inner annular shelf extending axially outwardly from said face for restricting expansion of a medial portion of the bladder rearwardly of said face when inflated whereby balloon portions of said bladder when inflated will form in front of and behind said ring to interlock the bladder and ring against slippage during bladder push.

29. The machine of claim 28 wherein said ring includes a flat annular radial plate forming said axially inner face and an annular axial flange at the radially inner periphery of said plate forming said annular shelf.

30. The machine of claim 29 wherein said annular radial plate and annular axial flange together are L-shape in cross section.

31. The machine of claim 28 wherein the axial length of said shelf is about one-sixth the axial length of said bladder.

* * * * *